US008870662B2

(12) United States Patent
Inuzuka

(10) Patent No.: US 8,870,662 B2
(45) Date of Patent: Oct. 28, 2014

(54) VIDEO GAME PROCESSING APPARATUS AND VIDEO GAME PROCESSING PROGRAM PRODUCT

(71) Applicant: Kabushiki Kaisha Square Enix, Tokyo (JP)

(72) Inventor: Taichi Inuzuka, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 72 days.

(21) Appl. No.: 13/850,528

(22) Filed: Mar. 26, 2013

(65) Prior Publication Data

US 2013/0260897 A1    Oct. 3, 2013

(30) Foreign Application Priority Data

Mar. 29, 2012  (JP) .................................. 2012-077021

(51) Int. Cl.
  *A63F 13/12* (2006.01)
  *A63F 13/30* (2014.01)
  *A63F 13/40* (2014.01)

(52) U.S. Cl.
  CPC ......... *A63F 13/12* (2013.01); *A63F 2300/5566* (2013.01); *A63F 2300/8029* (2013.01); *A63F 13/10* (2013.01)
  USPC .............................................. 463/42; 463/8

(58) Field of Classification Search
  CPC ......... A63F 13/10; A63F 13/12; A63F 23/55; A63F 23/5566; A63F 23/8029
  USPC ........................................ 463/8, 42
  See application file for complete search history.

(56) References Cited

U.S. PATENT DOCUMENTS

| 6,095,920 | A | 8/2000 | Sadahiro |
| 8,317,621 | B2 | 11/2012 | Yasue |
| 8,466,363 | B2 | 6/2013 | Tsuchida |
| 8,500,558 | B2 | 8/2013 | Smith |

(Continued)

FOREIGN PATENT DOCUMENTS

| JP | 09-234285 | 9/1997 |
| JP | 2001-334069 | 12/2001 |

(Continued)

OTHER PUBLICATIONS

ASCII Media Works Inc., "Dengeki Games", Dengeki Games vol. 15, Nov. 26, 2010, pp. 16-27, together with a partial English language translation.

(Continued)

*Primary Examiner* — Corbett B Coburn
(74) *Attorney, Agent, or Firm* — Greenblum & Bernstein, P.L.C.

(57) ABSTRACT

A video game processing apparatus for managing progress of a fighting game in which participating characters of a predetermined participation number participate along with a player character by receiving information necessary for the fighting game from other apparatuses is provided. The participating characters are determined on the basis of the player character and newly participating characters by referring to newly participating character related information containing newly participating character data and identification data of other newly participating apparatuses. In a case where the number of participating characters obtained by combining the player character and the newly participating characters is less than the predetermined participation number, participating characters of a deficient number are selected among already participating characters indicated by already participating character related information containing already participating character data and identification data of other already participating apparatuses to determine the participating characters of the predetermined participation number.

6 Claims, 7 Drawing Sheets

(56) References Cited

U.S. PATENT DOCUMENTS

| | | |
|---|---|---|
| 2007/0060359 A1 | 3/2007 | Smith |
| 2009/0144448 A1 | 6/2009 | Smith |
| 2012/0015741 A1* | 1/2012 | Craine et al. .................. 463/42 |
| 2013/0053152 A1 | 2/2013 | Tabata |
| 2013/0079155 A1 | 3/2013 | Kashitani |
| 2013/0296052 A1 | 11/2013 | Smith |

FOREIGN PATENT DOCUMENTS

| | | |
|---|---|---|
| JP | 2005-006766 | 1/2005 |
| JP | 2005-007198 | 1/2005 |
| JP | 2006-167102 | 6/2006 |
| JP | 2010-252863 | 11/2010 |
| JP | 2012-016523 | 1/2012 |
| WO | 2007/022487 | 2/2007 |

OTHER PUBLICATIONS

Enterbrain, Inc., "Dragon Quest Monsters-Joker 2", Weekly Famitsu vol. 25, No. 15, Apr. 1, 2010, pp. 224-227, together with a partial English language translation.

Office Action from Japan Patent Office (JPO) in Japanese Patent Application No. 2012-077021, dated Sep. 17, 2013, together with an English language translation thereof.

U.S. Appl. No. 13/855,231 to Shingo Kosuge, filed Apr. 2, 2013.

* cited by examiner

100: VIDEO GAME PROCESSING APPARATUS

Fig. 2

PLAYER CHARACTER RELATED INFORMATION

| PLAYER NAME | PLAYER ID | TERMINAL CLASSIFICATION ID | TERMINAL IDENTIFICATION ID | SOFTWARE IDENTIFICATION ID | ... | PLAYER CHARACTER DATA | | |
|---|---|---|---|---|---|---|---|---|
| | | | | | | CHARACTER NAME | OFFENSIVE POWER | PHYSICAL STRENGTH |
| P1 | P0001 | t-0001 | T0001 | S0001 | ... | C1 | 100 | 100 | ... |

Fig. 3

ALREADY PARTICIPATING CHARACTER RELATED INFORMATION

| No. | OTHER PLAYER NAME | ... | OTHER TERMINAL IDENTIFICATION ID | ... | ALREADY PARTICIPATING CHARACTER DATA | | | ... | DATE AND TIME FOR PARTICIPATION |
|---|---|---|---|---|---|---|---|---|---|
| | | | | | CHARACTER NAME | OFFENSIVE POWER | PHYSICAL STRENGTH | | |
| 1 | P12 | ... | T0012 | ... | C12 | 70 | 80 | ... | xx:xx |
| 2 | P13 | ... | T0013 | ... | C13 | 80 | 90 | ... | xx:xx |
| 3 | P14 | ... | T0014 | ... | C14 | 90 | 80 | ... | xx:xx |
| ... | ... | ... | ... | ... | ... | ... | ... | ... | ... |

Fig. 4

NEWLY PARTICIPATING CHARACTER RELATED INFORMATION

| No. | OTHER PLAYER NAME | ... | OTHER TERMINAL IDENTIFICATION ID | ... | NEWLY PARTICIPATING CHARACTER DATA | | | ... | DATE AND TIME FOR PARTICIPATION |
|---|---|---|---|---|---|---|---|---|---|
| | | | | | CHARACTER NAME | OFFENSIVE POWER | PHYSICAL STRENGTH | | |
| 1 | P2 | ... | T0002 | ... | C2 | 70 | 80 | ... | xx:xx |
| 2 | P3 | ... | T0003 | ... | C3 | 80 | 90 | ... | xx:xx |
| 3 | P4 | ... | T0004 | ... | C4 | 90 | 80 | ... | xx:xx |
| ... | ... | ... | ... | ... | ... | ... | ... | ... | ... |

Fig. 5

FIGHTING GAME RELATED INFORMATION

| FIGHTING FORM | PARTICIPATION NUMBER | FIGHTING RULE | PRIZE INFORMATION | |
|---|---|---|---|---|
| | | | PRIZE AWARDING CONDITION | PRIZE DATA |
| TOURNAMENT MATCH | 5 | CHARACTER WHOSE PHYSICAL STRENGTH BECOMES ZERO IS LOSER | FIRST PLACE | ITEM A |
| | | | SECOND PLACE | ITEM B |
| | | | THIRD PLACE | ITEM C |
| | | | OTHERS | ITEM D |
| TOURNAMENT MATCH | 10 | ..... | FIRST PLACE | ITEM D |
| | | | SECOND PLACE | ITEM E |
| | | | THIRD PLACE | ITEM F |
| ... | ... | ... | ... | ... |
| LEAGUE MATCH (ROUND ROBIN TOURNAMENT) | 5 | ... | FIRST PLACE | ITEM S |
| ... | ... | ... | ... | ... |

US 8,870,662 B2

VIDEO GAME PROCESSING APPARATUS AND VIDEO GAME PROCESSING PROGRAM PRODUCT

CROSS-REFERENCE TO RELATED APPLICATION

The present application relates to subject matter contained in Japanese Patent Application No. 2012-077021, filed on Mar. 29, 2012, the disclosure of which is expressly incorporated herein by reference in its entirety.

BACKGROUND OF THE INVENTION

1. Field of the Invention

The present invention relates to a technique for controlling progress of a video game.

2. Description of the Related Art

Heretofore, video games each called an RPG (role-playing game: a game in which a player plays a role of a character in a world of the game, and accomplishes a predetermined object while enjoying a process that the character grows through various experiences) have been provided.

In this RPG, in a case where a player character that acts in response to an operation of a player wins a battle against an enemy character that inhibits achievement of a predetermined purpose, various privileges such as an experience value or an item are generally applied to the player character.

Further, in such video games, there is one in which a fighting by a plurality of players can be carried out by means of communication (network) among a plurality of game machines. More specifically, for example, there is a game system in which: a plurality of mobile game machines each having a wireless communication unit by Near Field Communication (NFC) are provided; broadcast transmission of predetermined data and reception of broadcast data from other game machine are alternately carried out for searching of a correspondent in each game machine; and a communication fighting game (network fighting game) is carried out between both game machines in a case where it is determined that, after establishment of connection, a fighting condition is satisfied between the both game machines that establish the connection. This game system allows the player to easily enjoy the fighting game with the desired opponent (see Japanese Patent Application Publication No. 2005-006766, for example).

However, in a video game controlled by a conventional video game processing apparatus, there has been a problem that a player may not be able to feel an effect intended by a designer of the video game in a case where the number of opponents that can carry out a fighting by means of communication (that is, network play) is fewer. Namely, there has been a problem that an impression that a video game designed in consideration of five or more correspondents gives to players may vary greatly between a case where five or more correspondents play the video game and a case where only two correspondents play the video game, for example.

Further, such a problem also becomes a problem in a video game (fighting game) that has a feature in which a player battles against another player with network play.

SUMMARY OF THE INVENTION

The present invention has been made in order to solve the problems described above, and it is an object of the present invention to provide a match-up type video game with rich variation, which can keep interest of a player in the video game.

In order to achieve the above objects, the present invention is directed to a video game processing apparatus for managing progress of a fighting game by receiving information necessary for the fighting game from other apparatuses. In this case, characters of a predetermined participation number participate in the fighting game. The video game processing apparatus includes a player character related information memory for storing player character related information, the player character related information containing identification data of the video game processing apparatus and player character data, the player character data indicating various kinds of data regarding a player character, the player character being a character that can be operated by a player who operates the video game processing apparatus.

The video game processing apparatus also includes an already participating character related information memory for storing already participating character related information, the already participating character related information containing already participating character data and identification data of other already participating apparatuses, the already participating character data indicating various kinds of data regarding already participating characters of other apparatus characters, the other apparatus characters being characters that can be operated by other players, the other players being players who respectively operate the other apparatuses, the already participating characters being characters that have a past record to participate in a fighting game that has been played in the past by the video game processing apparatus, the other already participating apparatuses being respectively operated by the other players each operating the already participating character.

The video game processing apparatus also includes a newly participating character related information memory for storing newly participating character related information, the newly participating character related information containing newly participating character data and identification data of other newly participating apparatuses, the newly participating character data indicating various kinds of data regarding newly participating characters, the newly participating characters being characters that can newly participate in the fighting game, players who operate the newly participating characters respectively operating the other newly participating apparatuses.

The video game processing apparatus also includes a participating character determiner for determining participating characters by referring to the newly participating character related information, the participating characters participating in the fighting game along with the player character.

The video game processing apparatus also includes a fighting controller for controlling a fighting between the participating characters determined by the participating character determiner.

In the video game processing apparatus, in a case where the number of characters obtained by combining the player character and the newly participating characters is less than the predetermined participation number, the participating character determiner refers to the already participating character related information; selects participating characters of a deficient number among the already participating characters; and determines the participating characters of the predetermined participation number.

By configuring it as described above, it is possible to maintain interest of players in a fighting game even in a case where there are a few participants when to hold the fighting game in which a plurality of players can participate.

In the video game processing apparatus according to the present invention, it is preferable that the video game processing apparatus further includes: a bonus related information creator for creating bonus related information, the bonus related information containing bonus information and the identification data corresponding to the respective participating characters, the bonus information indicating a bonus to be awarded to each of the participating characters that participate in the fighting game in a case where the fighting game is terminated; a connector for searching for other apparatus to automatically connect to the other apparatus by wireless connections, the other apparatus becoming a correspondent of the video game processing apparatus; and a bonus information transmitter for transmitting the bonus information to the other apparatus connected by wireless connections by the connector.

In the video game processing apparatus according to the present invention, it is preferable that the video game processing apparatus further includes: a participation request receiver for receiving a participation request into the fighting game from the other apparatus, the participation request being carried out by presenting player character related information stored in the other apparatus as well as the video game processing apparatus; a newly participating character related information storer for storing the player character related information received by the participation request receiver in the newly participating character related information memory as the newly participating character related information; and an already participating character related information storer for storing the newly participating character related information in the already participating character related information memory as the already participating character related information in a case where the fighting game is terminated, the newly participating character related information indicating the participating character that participates in the fighting game.

In the video game processing apparatus according to the present invention, it is preferable that the fighting game is a video game in which opponents are determined by assigning the participating characters into participation boxes of the participation number of a tournament match or a league match, and that the video game processing apparatus further includes: a participating character assignor for arbitrarily assigning the participating characters of the participation number determined by the participating character determiner into the participation boxes.

In the video game processing apparatus according to the present invention, it is preferable that the video game processing apparatus further includes: a simplified fighting executor for carrying out a simplified fighting by the participating character on the basis of a predetermined simplified victory/defeat decision rule for deciding victory or defeat in the simplified fighting, the simplified fighting being a fighting in which the victory or defeat is simply decided by comparing the character data of the fighting characters, wherein the participating character assignor assigns the participating characters into the participation boxes in accordance with a result of the simplified fighting carried out by the simplified fighting executor.

Moreover, in another aspect of the present invention, the present invention is directed to a video game processing program product for causing a computer to receive information necessary for a fighting game from other apparatuses and to manage progress of the fighting game. In this case, characters of a predetermined participation number participate in the fighting game. Further, the computer includes a player character related information memory for storing player character related information, the player character related information containing identification data of the video game processing apparatus and player character data, the player character data indicating various kinds of data regarding a player character, the player character being a character that can be operated by a player who operates the video game processing apparatus. The computer also includes an already participating character related information memory for storing already participating character related information, the already participating character related information containing already participating character data and identification data of other already participating apparatuses, the already participating character data indicating various kinds of data regarding already participating characters of other apparatus characters, the other apparatus characters being characters that can be operated by other players, the other players being players who respectively operate the other apparatuses, the already participating characters being characters that have a past record to participate in a fighting game that has been played in the past by the video game processing apparatus, the other already participating apparatuses being respectively operated by the other players each operating the already participating character. The computer also includes a newly participating character related information memory for storing newly participating character related information, the newly participating character related information containing newly participating character data and identification data of other newly participating apparatuses, the newly participating character data indicating various kinds of data regarding newly participating characters, the newly participating characters being characters that can newly participate in the fighting game, players who operate the newly participating characters respectively operating the other newly participating apparatuses.

The video game processing program product according to the present invention causes the computer to execute steps including determining participating characters by referring to the newly participating character related information, the participating characters participating in the fighting game along with the player character.

The steps also include controlling a fighting between the participating characters determined in the determining participating characters.

The steps also include controlling a fighting between the participating characters determined in the determining participating characters.

In this case, the determining participating characters includes, in a case where the number of characters obtained by combining the player character and the newly participating characters is less than the predetermined participation number, referring to the already participating character related information; selecting participating characters of a deficient number among the already participating characters; and determining the participating characters of the predetermined participation number.

According to the present invention, it is possible to maintain interest of players in a fighting game even in a case where there are a few participants when to hold the fighting game in which a plurality of players can participate.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing showing an example of a storage state of player character related information;

FIG. 3 is an explanatory drawing showing an example of a storage state of already participating character related information;

FIG. 4 is an explanatory drawing showing an example of a storage state of newly participating character related information;

FIG. 5 is an explanatory drawing showing an example of a storage state of fighting game related information;

DETAILED DESCRIPTION OF THE INVENTION

Hereinafter, an example of one embodiment of the present invention will be described with reference to the appending drawings.

Figure 1:
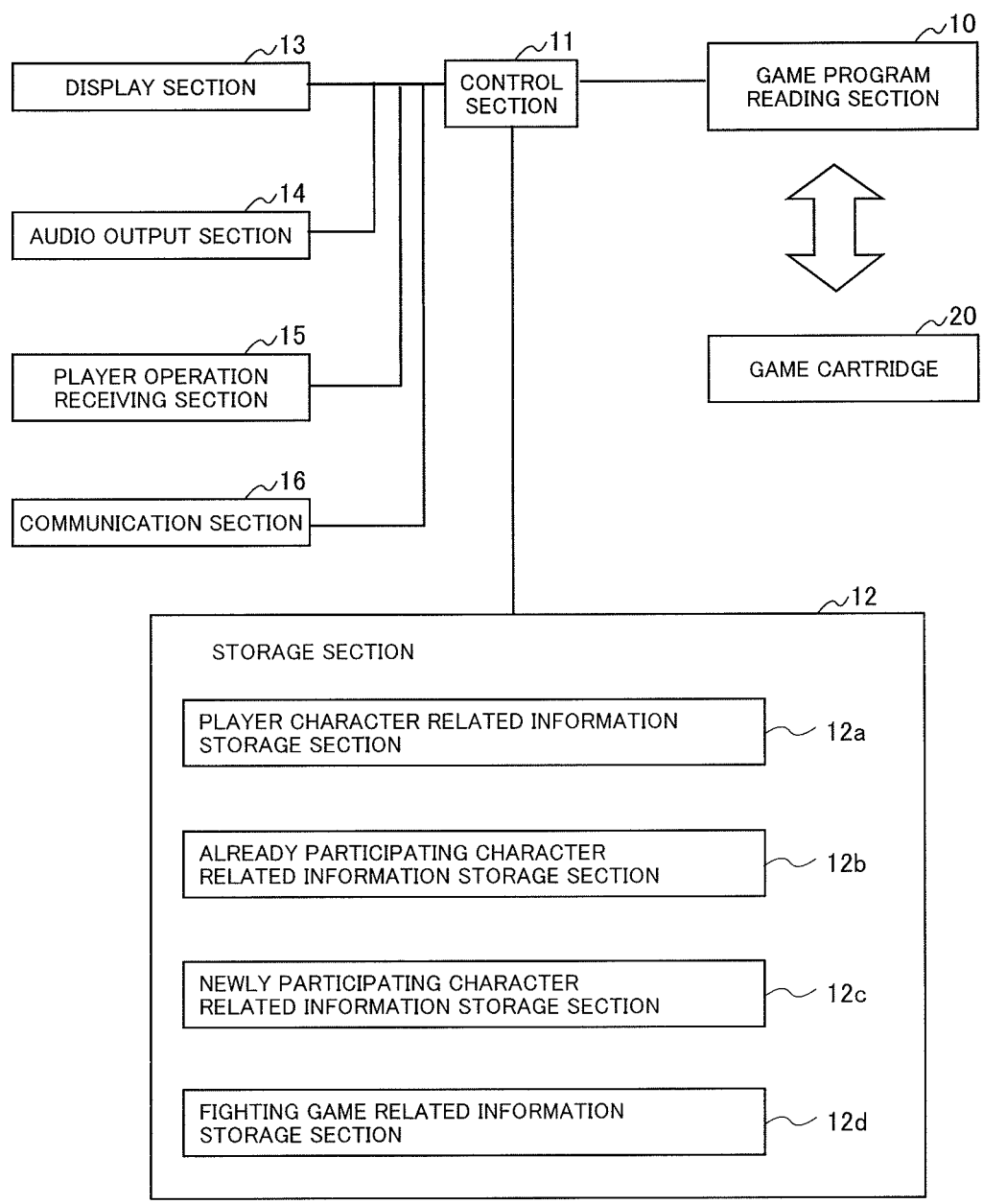
FIG. 1 is a block diagram showing a configuration example of a video game processing apparatus.

FIG. 1 is a block diagram showing a configuration example of a video game processing apparatus 100 according to one embodiment of the present invention. As shown in FIG. 1, the video game processing apparatus 100 includes: a game program reading section 10; a control section 11; a storage section 12; a display section 13; an audio outputting section 14; a player operation receiving section 15; and a communication section 16.

The game program reading section 10 detachably receives a game cartridge 20 into which a storage medium is embedded. A game program is stored in the storage medium. The game program reading section 10 reads out a necessary game program from the storage medium in the inserted game cartridge 20. In this regard, in this embodiment, a video game program classified into an RPG is stored in the storage medium embedded into the game cartridge 20. However, a category to which a video game program stored in a storage medium embedded into the game cartridge 20 is not limited to an RPG. The category of the video game may be one in which the video game processing apparatus 100 receives information from another video game processing apparatus (other apparatus) operated by another player via communications and utilizes the received information in the video game controlled by its own apparatus (that is, the video game processing apparatus 100).

The control section 11 has a function to carry out the game program read out by the game program reading section 10 and stored in the storage section 12, and to carry out various kinds of controls for causing a video game to proceed in response to operations by a player.

The storage section 12 is a storage medium for storing game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In the present embodiment, the storage section 12 includes: a player character related information storage section 12a; an already participating character related information storage section 12b; a newly participating character related information storage section 12c; and a fighting game related information storage section 12d.

The player character related information storage section 12a is a storage medium for storing player character related information that is information on a player character. The player character is a character that a player P1, who plays a video game by operating the video game processing apparatus 100, operates. In the present embodiment, the player character related information contains identification data on the video game processing apparatus 100 and player character data indicating various kinds of data on the player character.

FIG. 2 is an explanatory drawing showing an example of a storage state of the player character related information stored in the player character related information storage section 12a. As shown in FIG. 2, the player character related information contains a player name; a player ID; a terminal classification ID; a terminal identification ID; a software identification ID; and player character data.

Here, the "player character data" means various kinds of data relating to a character that the player P1 can operate (that is, a player character). In the present embodiment, the player character data contain: a character name; an offensive power; a physical strength; and a defensive power. In this regard, a configuration of the player character data is not limited to this. For example, the player character data may contain various kinds of information indicating a communication history, a play time of the video game, a progress situation of the video game and the like.

The already participating character related information storage section 12b is a storage medium for storing already participating character related information. The already participating character related information is information on characters other than the player character, which has a past record (or track record) of participation in a video game controlled by the video game processing apparatus 100. In the present embodiment, the already participating character related information contains: already participating character data; and identification data of other apparatuses each having a similar configuration to that of the video game processing apparatus 100. The already participating character data indicate various kinds of data regarding already participating characters of other apparatus characters. The other apparatus characters are characters each of which can be operated by other player who is a player operating the other apparatus. The already participating characters are characters each having a past record to participate in a fighting game (match-up game) that has been played in the past by the video game processing apparatus 100. The other apparatuses are respectively operated by the other players each operating the already participating character.

In this regard, the method of participating in the fighting game is not particularly limited to this. For example, the video game processing apparatus 100 may be configured so that a player (other player) of other apparatus can participate in a fighting game as a companion of the player character of an apparatus (in the present embodiment, the video game processing apparatus 100) that holds the fighting game. Alternatively, the video game processing apparatus 100 may be configured so that the other player can select whether to participate in the fighting game as an enemy or not.

FIG. 3 is an explanatory drawing showing an example of a storage state of the already participating character related information stored in the already participating character related information storage section 12b. As shown in FIG. 3, the already participating character related information contains: a name of other player (other player name); a terminal identification ID; already participating character data; and the date and time of participation.

Here, the "other player name" denotes a name of a player who is registered as an operator of the already participating character. Further, the "other player ID" is an ID registered as an operator of the already participating character. Further, the "already participating character data" means various kinds of data regarding the already participating characters. In the present embodiment, the already participating character data contain: a character name; an offensive power; a physical strength; and a defensive power.

Further, the "date and time for participation" means the date and time when each of already participating characters participates in a fighting game (in the present embodiment, the date and time when the fighting game in which the already participating character participates ends). Here, in the present embodiment, the already participating character related information is stored in the already participating character related information storage section 12b by carrying out tournament match holding processing (will be described later, see FIG. 6). In this regard, a configuration of the already participating character related information is not limited to this. For example, the already participating character related information may contain various kinds of information indicating a communication history with the player P1, a scoreline (victory or defeat), and the like. Further, the number of already participating characters stored in the already participating character related information storage section 12b may put an upper limit depending upon a performance of the video game processing apparatus 100.

The newly participating character related information storage section 12c is a storage medium for storing newly participating character related information. The newly participating character related information is information regarding a character that satisfies a participation condition of the video game controlled by the video game processing apparatus 100. In the present embodiment, the newly participating character related information contains: newly participating character data; and identification data of other apparatuses each of which a player who operates a newly participating character operates. The newly participating character data indicate various kinds of data on newly participating characters each of which is a character that can newly participate in the fighting game controlled by the video game processing apparatus 100.

FIG. 4 is an explanatory drawing showing an example of a storage state of the newly participating character related information stored in the newly participating character related information storage section 12c. As shown in FIG. 4, the newly participating character related information contains: a name of other player (other player name); a terminal identification ID; newly participating character data; and the date and time of reception of information.

In the present embodiment, as will be described later, the newly participating character related information is stored in the already participating character related information storage section 12b as the already participating character related information. Therefore, both of the newly participating character related information ad the already participating character related information have the same configuration. However, it is no need that the newly participating character related information is the same as the already participating character related information. In the present embodiment, the newly participating character information is particularly different from the already participating character related information in that the newly participating character information contains "the date and time of reception of information", which indicate the date and time when the video game processing apparatus 100 received the newly participating character related information.

In this regard, the configuration of the newly participating character related information is not limited to this. For example, the newly participating character related information may be configured so as to contain various kinds of information indicating a self-introduction text set up by a player who operates the newly participating character. Further, the video game processing apparatus 100 may be configured so that the upper limit for the number of newly participating characters stored in the newly participating character related information storage section 12c is set up in accordance with an operation of the player, for example.

The fighting game related information storage section 12d is a storage medium for storing fighting game related information that is information on the fighting game controlled by the video game processing apparatus 100. In the present embodiment, the fighting game related information contains various kinds of settings regarding plural kinds of fighting games that the video game processing apparatus 100 can control.

FIG. 5 is an explanatory drawing showing an example of a storage state of the fighting game related information stored in the fighting game related information storage section 12d. As shown in FIG. 5, the fighting game related information contains a fighting form, a participation number, a fighting rule, and prize information.

Here, in the present embodiment, the "fighting form" that indicates a form of a fighting game includes a tournament match (that is, a knockout tournament match or a single-elimination tournament match) and a league match (that is, a round robin tournament match or a group tournament match). Further, as the fighting rule, a rule to determine victory or defeat of players, such as "a character whose physical strength becomes zero is a loser", for example, is set up.

Further, the "participation number" means the number of participating characters that is set up in advance in accordance with each of the fighting forms. As shown in FIG. 5, in the present embodiment, the case where there is a situation in which the corresponding participation numbers are different from each other even though fighting forms are the same will be described as an example. In this regard, the participation number associated with the fighting form may be "the upper limit", "the minimum requirement number", "the number of participants (that is, the number of players in a case where a player causes a plurality of characters to participate in the fight)", or the like. Further, the video game processing apparatus 100 may be configured so that the participation number can be changed by the player.

Further, the "prize information" is information that indicates a prize (for example, an item in the fighting game). The prize is awarded to the player who participates in the fighting game in accordance with a result of a fighting game. In the present embodiment, the prize information contains a prize awarding condition and prize data.

The display section 13 is a display device for displaying the game screen in response to operations by the player in accordance with control by the control section 11. The display section 13 is constructed by a liquid crystal display, for example.

The audio outputting section 14 outputs audio in response to operations by the player and progress of the video game in accordance with control by the control section 11.

The player operation receiving section 15 receives operational signals in response to operations by the player via a controller constructed by a plurality of buttons, a mouse or the like, and notifies the control section 11 of its result. In the present embodiment, the player operation receiving section 15 is configured to receive operational signals from a touch panel and a keypad provided in the video game processing apparatus 100.

The communication section 16 causes the video game processing apparatus 100 to connect to a communication network such as the Internet by wireless or wired connections, and to transmit and receive various kinds of information. Further, the communication section 16 causes the video game apparatus 100 to connect to other video game processing apparatuses via a predetermined communication unit, for example. Therefore, the video game processing apparatus 100 provided with the communication section 16 has a function as a communication terminal.

Next, an operation of the video game processing apparatus 100 according to the present embodiment will be described. In the present embodiment, the case where the video game processing apparatus 100 holds a tournament match (in particular, a fighting form of a knockout tournament) as a base unit will be described as an example.

Figure 6:
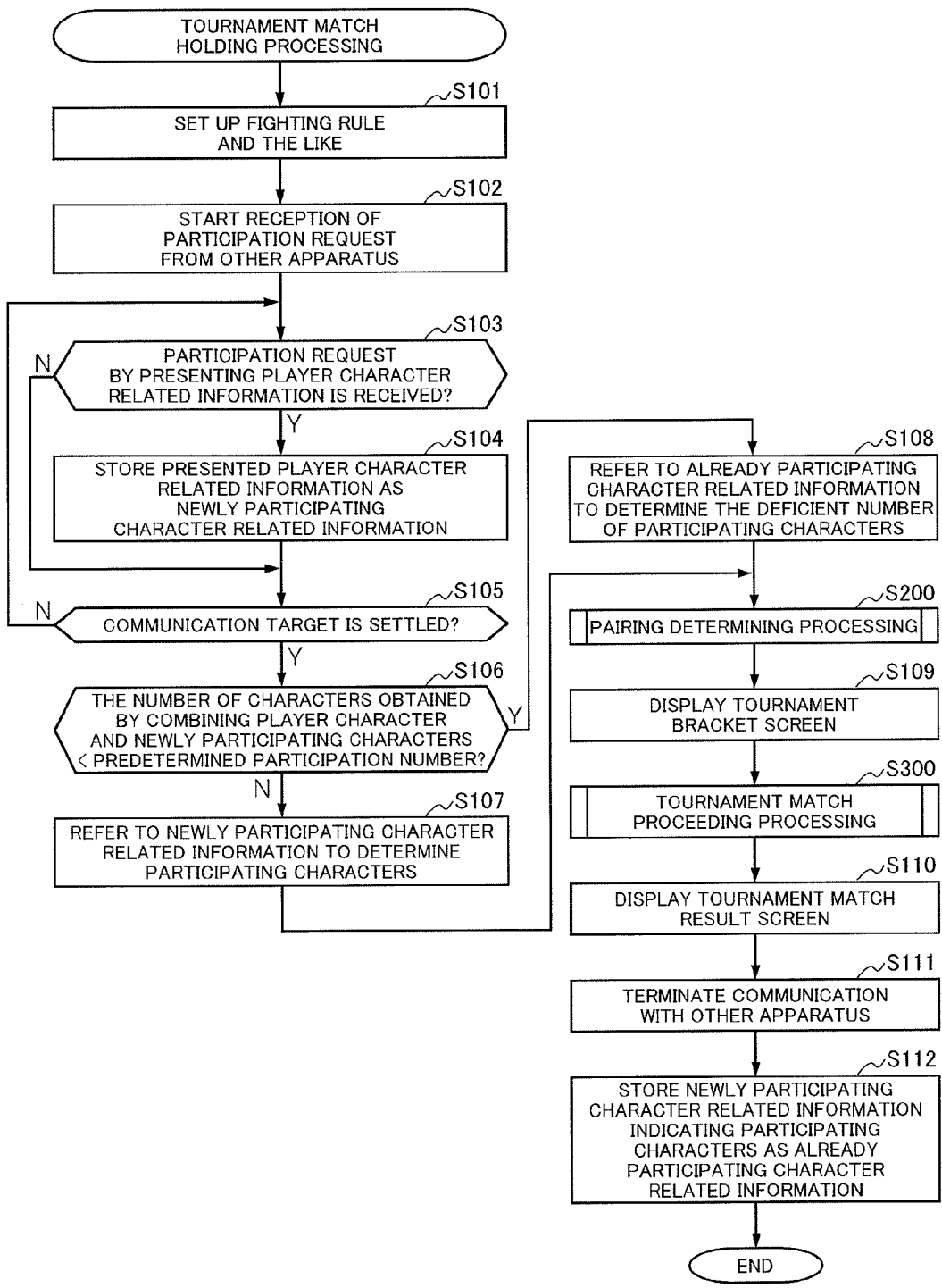
FIG. 6 is a flowchart showing an example of tournament match holding processing.

FIG. 6 is a flowchart showing an example of tournament match holding processing carried out by the video game processing apparatus 100 according to the present embodiment. In the tournament match holding processing, processing for the video game processing apparatus 100 to hold a tournament match in which a plurality of characters (or a plurality of players) participant is carried out. In this regard, the content of processing with no relationship to the present invention may be omitted.

The tournament match holding processing is started when an operational input regarding implementation of a tournament match is carried out from a top menu of the video game screen, for example.

In the tournament match holding processing, the control section 11 carries out various kinds of settings regarding a tournament match to be held from now, including a fighting rule and the like (Step S101). In the present embodiment, the control section 11 sets up a fighting rule and the like by receiving an input operation of a name of the tournament match and/or a selection operation of the fighting game related information from the player P1, for example.

When the fighting rule and the like are set up, the control section 11 starts reception of a participation request for a tournament match from other apparatus (Step S102). In this regard, the video game processing apparatus 100 may be configured so that, for the reception of the participation request, Near Field Communication (NFC) is utilized or the Internet or the like is utilized.

When reception of the participation request is started, the control section 11 determines whether a participation request for the tournament match by presenting player character related information (see FIG. 2) stored in the other apparatus as well as the video game processing apparatus 100 is received from the other apparatus or not (Step S103). In this regard, as the participation request, a character operated by the other apparatus and information necessary for connection between the other apparatus and the video game processing apparatus 100 (a terminal identification ID as identification data and the like) may be presented. For example, the video game processing apparatus 100 may be configured so that the other apparatus presents part of information managed as the player character related information.

Here, for example, in a case where it is determined that the participation request is not received because a predetermined time elapses since reception of the participation request is started ("No" at Step S103), the control section 11 causes the processing flow to shift to processing at Step S105 (will be described later).

On the other hand, for example, in a case where it is determined that the participation request is received because the participation request for the tournament match by presenting the player character related information stored in the other apparatus 101, which has the same configuration as the video game processing apparatus 100, is received from the other apparatus 101 ("Yes" at Step S103), the control section stores the player character related information thus presented in the newly participating character related information storage section 12c as the newly participating character related information (Step S104).

Subsequently, the control section 11 determines whether to settle a communication target or not (Step S105). In the present embodiment, the control section 11 determines that the communication target is to be settled in a case where the predetermined time elapses since reception of the participation request is started or in a case where participation requests are received by the participation number indicated by the fighting game related information selected by the player P1. In this regard, criteria for determination of timing when the communication target is to be settled are not limited to the elapsed time. Various criteria for determination, such as a criterion that a predetermined operation by the player is received, are thought, for example.

Here, in a case where it is determined that the communication target is not to be settled ("No" at Step S105), the control section 11 causes the processing flow to shift to the processing at Step S103.

On the other hand, in a case where it is determined that the communication target is to be settled ("Yes" at Step S105), the control section 11 terminates reception of the participation request, and determines whether the number of characters obtained by combining the player character and the newly participating characters is less than a predetermined participation number or not (Step S106). In this regard, in the present embodiment, the control section 11 uses the participation number indicated by the fighting game related information selected by the player P1 as the criteria for determination. Hereinafter, the case where a predetermined participation number is "6" will be descried as an example.

Here, for example, in a case where it is determined that the number of characters obtained by combining the player character and the newly participating characters is not less than the predetermined participation number because the number of characters is "6" ("No" at Step S106), the control section refers to the newly participating character related information to determine six participating characters (in the present embodiment, including one player character and five newly participating characters) (Step S107), and causes the processing flow to shift to processing at Step S200 (will be described later). In the present embodiment, the control section 11 determines, as the participating characters, a newly participating character corresponding to identification data of other apparatus, which is in a communicable state with the video game processing apparatus 100, of the participating characters indicated by the newly participating character related information. In this regard, the video game processing apparatus 100 may be configured so that, in a case where the number of the player character and the newly participating characters exceeds the predetermined participation number, the control section 11 preferentially determines, as the participating characters, the newly participating characters whose date and time for reception of information is earlier, for example. Alternatively, the video game processing apparatus 100 may also be configured so that the control section 11 determines the participating character in response to a selection operation by the player P1.

On the other hand, in a case where it is determined that the number of characters is less than the predetermined participation number because the number of characters obtained by combining the player character and the newly participating characters is "3" ("Yes" at Step S106), the control section 11 refers to the already participating character related information to select the deficient number of participating characters from the already participating characters, and determines the participation number of participating characters (Step S108). In the present embodiment, the control section 11 selects three already participating characters for the participating characters as the deficient number of participating characters.

In this regard, various methods are thought as a method of selecting participating characters from the already participating characters. For example, the various methods includes: a method of preferentially selecting one whose date and time for participation is older; a method of preferentially selecting one whose predetermined item (for example, an offensive power) is closer to an average value of the other participating characters of the already participating character data; a method in which selection of the player P1 is received; and a method of randomly selecting the participating characters. In the present embodiment, in a case where a plurality of already participating characters are stored in the already participating character related information storage section 12b, the control section 11 randomly selects the participation number of already participating character related information. In this regard, in a case where the number of characters of the already participating character related information stored in the already participating character related information storage section 12b is short of the deficient number of participating characters, the control section 11 assigns blank data or predetermined character data into participation boxes in a tournament bracket (see FIG. 8).

When the participating characters are determined (Steps S107 and S108), the control section 11 carries out processing for determining pairing of the participating characters in the tournament match (pairing determining processing) (Step S200). In this regard, the control section 11 determines an opponent of each participating character in accordance with a fighting form (not only the tournament match, but also the league match) by assigning the participating characters into the participation number of participation boxes.

Figure 7:
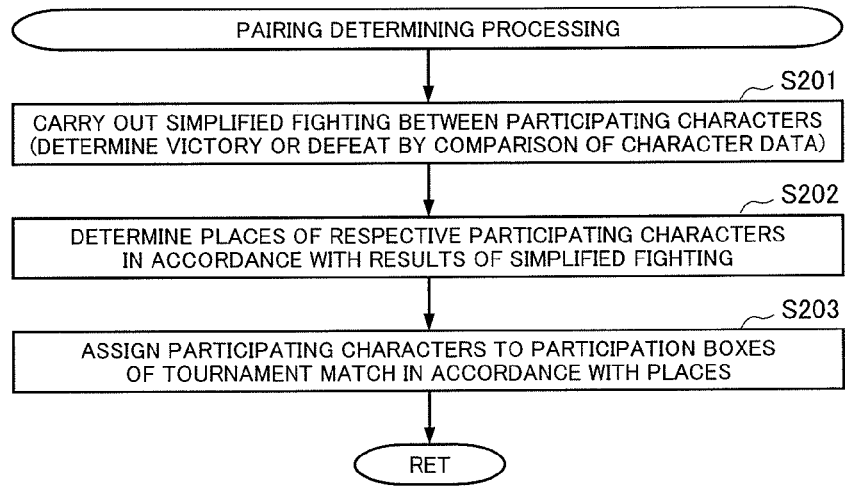
FIG. 7 is a flowchart showing an example of pairing determining processing.

FIG. 7 is a flowchart showing an example of pairing determining processing carried out by the video game processing apparatus 100 according to the present embodiment. In this regard, the content of processing with no relationship to the present invention may be omitted.

In the pairing determining processing, the control section 11 carries out a simplified fighting between the participating characters (Step S201). Here, the "simplified fighting" is a fighting in which victory or defeat is simply determined by comparing the character data of the characters that fight each other. In the present embodiment, the control section 11 carries out a simplified fighting between the participating characters on the basis of a predetermined simplified victory or defeat decision rule for deciding victory or defeat in the simplified fighting.

When the simplified fighting is carried out, the control section 11 determines a place (or a rank) of each of the participating characters in accordance with an execution result of the simplified fighting (Step S202). In the present embodiment, the control section 11 carries out the simplified fighting among all of the participating characters, and determines the places of the respective participating characters in accordance with the results. In this regard, the vide game processing apparatus 100 may be configured so that, in order to shorten the time until the tournament match is started, the control section 11 determines the places on the basis of previous scorelines (fighting results), or determines the places randomly. Further, the video game processing apparatus 100 may be configured so as to determine places of the respective participating character by combining these elements.

When the places of the respective participating characters are determined, the control section 11 assigns the participating characters into participation boxes of the tournament match in accordance with the determined places (Step S203), and causes the processing flow to shift to processing at Step S109 in the tournament match holding processing (see FIG. 6).

When the pairing determining processing is carried out, the control section 11 causes the display section 13 to display the tournament bracket screen on the display screen thereof on the basis of an assignment status of the participating character (Step S109).

Figure 8:
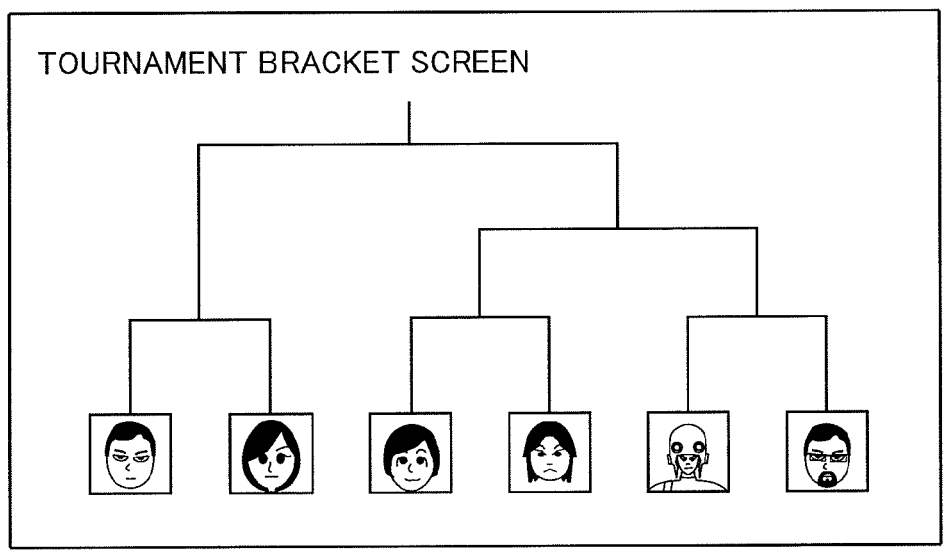
FIG. 8 is an explanatory drawing showing an example of a tournament bracket screen.

FIG. 8 is an explanatory drawing showing an example of a tournament bracket screen. As shown in FIG. 8, in the present embodiment, a tournament bracket in which images (character images) each indicating a part of appearance of each of the participating characters (for example, a face) are arranged o the participation boxes (that is, a tournament bracket in which the participating characters are assigned into the participation boxes) is displayed as the tournament bracket screen. In this regard, for example, the video game processing apparatus 100 may be configured so that, in a case where selection of a character image by the player P1 is received, the control section 11 causes the display section 13 to display information regarding the participating character according to the selected character image.

When the tournament bracket screen is displayed, the control section 11 carries out processing to cause a tournament match to proceed (tournament match proceeding processing) (Step S300).

Figure 9:
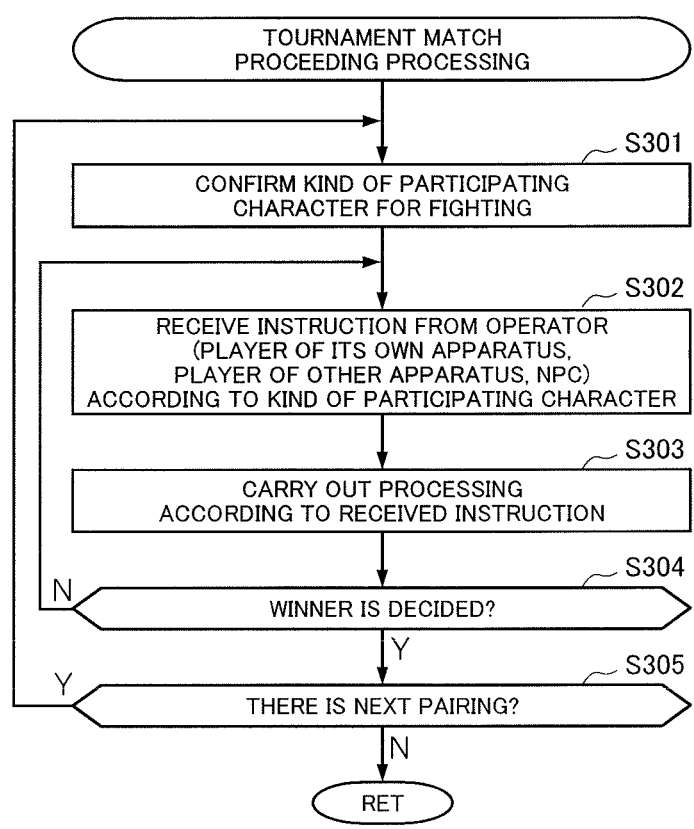
FIG. 9 is a flowchart showing an example of tournament match proceeding processing.

FIG. 9 is a flowchart showing an example of the tournament match proceeding processing carried out by the video game processing apparatus 100 according to the present embodiment. In this regard, the content of processing with no relationship to the present invention may be omitted.

In the tournament match proceeding processing, the control section 11 confirms a kind (or type) of a participating character for fighting (Step S301). In the present embodiment, the control section 11 confirms whether the participating character for fighting is any one of the player character, a newly participating character, and an already participating character.

When the kind of the participating character for fighting is confirmed, the control section 11 receives an instruction from an operator according to the kind of the participating character, whereby the fighting is caused to proceed (Step S302). In the present embodiment, in a case where the participating character for fighting is the player character, the control section 11 receives an instruction from the player P1 who plays the video game by operating the video game processing apparatus 100. Further, in a case where the participating character for fighting is a newly participating character, the control section 11 receives an instruction from a player who operates other apparatus using wireless connections or the like. Moreover, in a case where the participating character for fighting is an already participating character, the control section 11 determines an instruction according to a predetermined rule, and receives the determined instruction (that is, in a case where the participating character is set to the already participating character, the control section 11 deals with the participating character as a so-called non-player character NPC).

When the instruction is received from the operator, the control section 11 carries out processing according to the received instruction (Step S303). In this regard, in the present embodiment, for each fighting in the tournament match, a general fighting method, in which a command selection by an operator is received and the participating character is caused to carry out an action according to the selected command, is used. In this regard, the fighting method in each fighting is not particularly limited. The fighting method may be one in which the control section 11 can obtain information (progress information) necessary for causing the tournament to proceed.

When the processing according to the received instruction is carried out, the control section 11 determines whether a winner is decided or not on the basis of a predetermined criterion for determination (Step S304). In the present embodiment, the control section 11 decides the one participating character, which reduces a physical strength of the opponent to a predetermined number between the participating characters during the fighting, as a winner.

Here, in a case where it is determined that the winner is not decided ("No" at Step S304), the control section 11 causes the processing flow to shift to the processing at Step S302.

On the other hand, in a case where it is determined that the winner is decided ("Yes" at Step S304), the control section 11 determines whether there is a next pairing or not on the basis of the tournament bracket into which the participating characters are assigned (Step S305).

Here, in a case where it is determined that there is a next pairing ("Yes" at Step S305), the control section 11 causes the processing flow to shift to the processing at Step S301 in order to start a fighting of the next pairing.

On the other hand, in a case where it is determined that there is no next pairing because a champion of the tournament match has been decided ("No" at Step S305), the control section 11 causes the processing flow to shift to the processing at Step S110 in the tournament match holding processing (see FIG. 6).

When the tournament match proceeding processing is carried out, the control section 11 causes the display section 13 to display a tournament match result screen on the display screen on the basis of a result of the tournament match proceeding processing (that is, a result of the fighting by the respective participating characters) (Step S110). As a configuration of the tournament match result screen, various kinds of configurations are thought, such as a configuration in which an image of each of higher ranking winners in the tournament match is displayed, for example (not shown in the drawings).

When the tournament match result screen is displayed, the control section 11 terminates the communication with the other apparatus corresponding to the participating character (that is, the other apparatus for which the video game processing apparatus 100 stores the information indicating the participating character as the player character information) (Step S111). In the present embodiment, the control section 11 temporarily stores information indicating the communication target when to settle the communication target, and erases the information thus stored temporarily when to terminate the communication.

When the communication with the other apparatus is terminated, the control section 11 stores the newly participating character related information indicating the participating characters that participate in the fighting game in the already participating character related information storage section 12b as the already participating character related information (Step S112), and terminates the processing herein.

Figure 10:
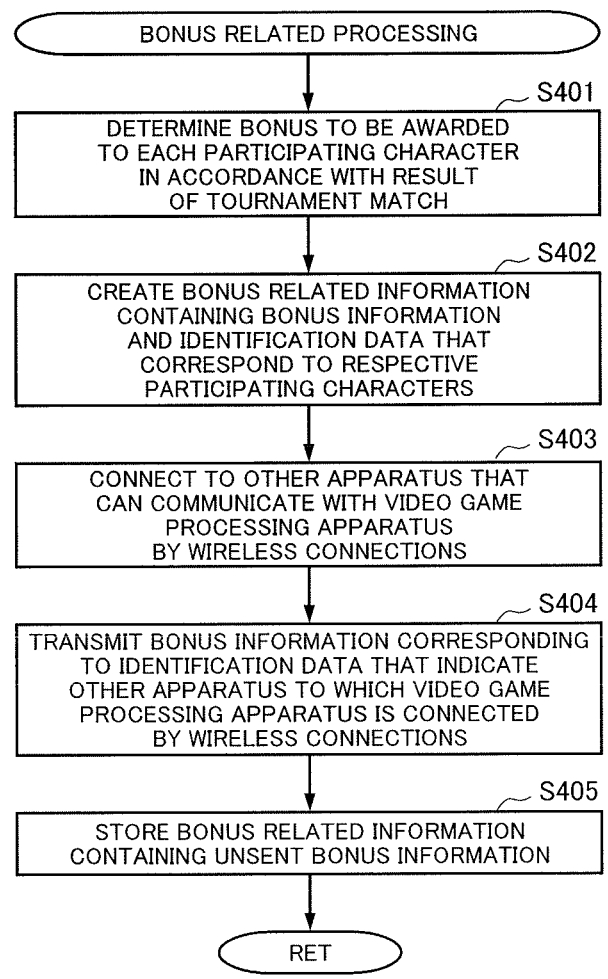
FIG. 10 is a flowchart showing an example of bonus related processing.

FIG. 10 is a flowchart showing an example of bonus related processing carried out by the video game processing apparatus 100. In the bonus related processing, processing regarding a bonus to be awarded to a character (or a player) that participates in a tournament match is carried out.

The bonus related processing is started in a case where the fighting game (in the present embodiment, the tournament match) is terminated, for example. In the present embodiment, the control section 11 starts the bonus related processing in a case where a result of the tournament match is got, that is, in a case where the tournament match proceeding processing (see FIG. 9) is terminated. In this regard, although it has not been mentioned particularly in the explanation of the tournament match holding processing, the video game processing apparatus 100 may be configured so that the control section 11 reflects a result of the bonus related processing to the tournament match result screen.

In the bonus related processing, the control section 11 determines a bonus to be awarded to each of the participating characters in accordance with a result of the tournament match (Step S401). In the present embodiment, the control section 11 refers to the fighting game related information (see FIG. 5), and determines a bonus to be awarded to each of the participating characters among prize data indicated by the prize information on the basis of the prize information corresponding to the fighting form of the held fighting game and a result of the fighting game.

When the bonus is determined, the control section 11 creates bonus related information (Step S402). The bonus related information contains: bonus information indicating a bonus; and identification data that correspond to the respective participating characters (for example, a terminal identification ID and a player ID).

When the bonus related information is created, the control section 11 causes the video game processing apparatus 100 to connect to other apparatus, with which the video game processing apparatus 100 can communicate, by wireless connections (Step S403). In the present embodiment, the control section 11 searches for other apparatus that will become a correspondent, which exists within a predetermined neighboring range, and causes the video game processing apparatus 100 to automatically connect to the searched other apparatus by wireless connections.

When the video game processing apparatus 100 is connected to the other apparatus by wireless connections, the control section 11 transmits bonus information corresponding to the identification data, which indicate the other apparatus to which the video game processing apparatus 100 is connected by wireless connections, to the other apparatus (Step S404). In the present embodiment, the control section 11 searches for bonus related information containing the identification data that indicate the other apparatus to which the video game processing apparatus 100 is connected by wireless connections, and transmits the bonus information contained in the searched bonus related information to the other apparatus.

When the bonus information is transmitted, the control section 11 stores bonus related information containing unsent bonus information (that is, bonus information contained in bonus related information containing identification data indicating other apparatus for which the video game processing apparatus 100 has never searched) in a predetermined memory (unsent bonus related information memory) of the storage section 12 (Step S405), and terminates the processing herein. In this regard, when the video game processing apparatus 100 newly starts to be connected to other apparatus by wireless connections, the video game processing apparatus 100 refers to the bonus related information stored in the unsent bonus related information memory. In a case where the other apparatus newly connected to the video game processing apparatus 100 by wireless connections is an apparatus corresponding to the identification data contained in the bonus related information, the video game processing apparatus 100 uses the bonus related information (that is, transmits the bonus information therein), and erases the corresponding bonus related information from the unsent bonus related information memory.

As explained above, in the embodiment described above, the video game processing apparatus 100 that manages progress of a fighting game (for example, the tournament match) in which a predetermined participation number of characters participate by receiving information necessary for the fighting game from other apparatus (for example, the other apparatus 101 that has the same configuration as that of the video game processing apparatus 100) is configured so as to: include the player character related information storage section 12a for storing the player character related information that contains the identification data of the video game processing apparatus 100 (for example, the terminal identification ID) and the player character data indicating various kinds of data regarding the player character, which is a character that can be operated by the player P1 who operates the video game processing apparatus 100; include the already participating character related information storage section 12b for storing the already participating character related information that contains the already participating character data and the identification data of the other already participating apparatuses (for example, the terminal identification IDs), the already participating character data indicating various kinds of data regarding already participating characters of other apparatus characters, the other apparatus characters being characters that can be operated by other players, the other players being players who respectively operate the other apparatuses, the already participating characters being characters that have a past record to participate in a fighting game that has been played in the past by the video game processing apparatus 100, the other already participating apparatuses being respectively operated by the other players each operating the already participating character; include the newly participating character related information storage section 12c for storing the newly participating character related information, the newly participating character related information containing newly participating character data and identification data of other newly participating apparatuses (for example, the terminal identification ID), the newly participating character data indicating various kinds of data regarding newly participating characters, the newly participating characters being characters that can newly participate in the fighting game, players who operate the newly participating characters respectively operating the other newly participating apparatuses; determine participating characters by referring to the newly participating character related information, the participating characters participating in the fighting game along with the player character; control a fighting between the determined participating characters; and, in a case where the number of characters obtained by combining the player character and the newly participating characters is less than the predetermined participation number, refer to the already participating character related information, select participating characters of a deficient number among the already participating characters, and determine the participating characters of the predetermined participation number (see Step S108). Therefore, it is possible to maintain interest of players in a fighting game even in a case where there are a few participants (that is, even in a case where there are enough persons interested in signing up) when to hold the fighting game in which a plurality of players can participate.

Namely, even in a case where there are a few correspondents, it becomes possible to replenish participants on the basis of an execution history of the fighting game. Therefore, it becomes possible to prevent interest of players in the fighting game from being lowered even in a case where there are a few participants.

Further, in the embodiment described above, the video game processing apparatus 100 may be configured so as to: create bonus related information, the bonus related information containing bonus information and the identification data (for example, the terminal identification ID) corresponding to the respective participating characters, the bonus information indicating a bonus to be awarded to each of the participating characters that participate in the fighting game in a case where the fighting game (for example, the tournament match) is terminated (see Step S402); search for other apparatus (for example, other apparatus that exists within the predetermined neighboring range of the video game processing apparatus 100) to automatically connect to the other apparatus by wireless connections, the other apparatus becoming a correspondent of the video game processing apparatus 100 (see Step S403); and transmit the bonus information to the other apparatus connected to the video game processing apparatus 100 by wireless connections (see Step S404). Therefore, it becomes possible to provide a merit to participate in the fighting game as the already participating character, and this makes it possible to motivate the player to communicate with other apparatuses. Therefore, it becomes possible to enlarge the number of players in the video game.

In this regard, although it has not been mentioned particularly in the embodiment described above, the video game processing apparatus 100 may be configured so as to determine the bonus to be awarded to the participating character indicated by the already participating character related information on the basis of a different rule from the rule in a case where the information indicating the participating character is the newly participating character related information.

Further, in the embodiment described above, the video game processing apparatus 100 may be configured so as to: receive a participation request into the fighting game from the other apparatus, the participation request being carried out by presenting player character related information stored in the other apparatus as well as the video game processing apparatus 100 (see Step S103); store the received player character related information in the newly participating character related information storage section 12c as the newly participating character related information (see Step S104); and store the newly participating character related information in the already participating character related information memory as the already participating character related information in a case where the fighting game is terminated (for example, after a result screen of the tournament match is displayed), the newly participating character related information indicating the participating character that participates in the fighting game (see Step S112). Thus, in a case where the participation number is less than the number assumed by a designer of the video game or the like, for example, it is possible to cause a character of other player, who causes the character to participate in a fighting game in the past, to participate in the fighting game without causing a character in common stored in each of a plurality of video game processing apparatuses (for example, an enemy character that appears in the middle of a story of the video game) to participate in the fighting game. Therefore, it becomes possible to apply the uniqueness to the fighting game that every video game processing apparatus holds.

Further, in the embodiment described above, the video game processing apparatus 100 may be configured so that: the fighting game is a video game in which opponents are determined by assigning the participating characters into participation boxes of the participation number of a tournament match or a league match; and the video game processing apparatus 100 arbitrarily assigns the determined participating characters of the predetermined participation number into the participation boxes. Therefore, it is possible to effectively realize a fighting game in which characters of a predetermined participation number participate.

Further, in the embodiment described above, the video game processing apparatus 100 may be configured so as to: carry out a simplified fighting by the participating characters on the basis of the predetermined simplified victory/defeat (victory or defeat) decision rule for deciding victory or defeat in the simplified fighting, the simplified fighting being a fighting in which the victory or defeat is simply decided by comparing the character data of the fighting characters (for example, the player character data and the newly participating character data in a case where the player character fights a newly participating character) (see Step S201); and assign the participating characters into the participation boxes in accordance with a result of the simplified fighting thus carried out (see Step S203). Therefore, it becomes possible to adjust progress of the tournament match in accordance with a status of each of the participating characters. Namely, for example, by assigning the participating characters into the participation boxes so that a participating character with a high status (for example, the participating character has a high offensive power or a high level) does not fight against any other participating character at early stages of the tournament match, it is possible to create the tournament bracket so that the players can expect to carry out a fighting between the participating characters each having a high status at latter stages (the endgame) of the tournament match. This makes it possible to improve interest of the player in the tournament match. Further, it is possible to motivate the player who participates in the tournament match to cause a growth of his or her own character. In this regard, it is preferable that the video game processing apparatus 100 is configured so that a fighting whose victory or defeat is not determined only by means of comparison of the character data is carried out in each fighting of the tournament match.

In this regard, although it has not been mentioned particularly in the embodiment described above, the video game processing apparatus 100 may be configured so as to: create receiving position information, the receiving position information indicating a position at which the participation request by presenting the player character related information is received; store information containing the created receiving position information and the player character related information in the newly participating character related information storage section 12c as the newly participating character related information; and reflect the receiving position information to the determined content when to determine the participating characters. Namely, for example, the video game processing apparatus 100 may be configured so as to: preferentially select the newly participating character related information containing the receiving position information, the receiving position information indicating a receiving position near the position indicated by the position information set up in advance in the video game processing apparatus 100 compared with other newly participating character related information; and determine the newly participating character indicated by the selected newly participating character related information as the participating character. In this regard, the video game processing apparatus 100 may be configured so as to: store the newly participating character related information containing the receiving position information as the already participating character related information; and reflect the receiving position information to the determined content when to determine the participating character. By configuring the video game processing apparatus in such a manner, it is possible to reflect a receiving position of the video game processing apparatus 100 to selection of the character to be caused to participate in the fighting game, and it becomes possible to apply the uniqueness to the fighting game that every video game processing apparatus holds.

In this regard, in the embodiment described above, the case where the player character related information transmitted and received by the video game processing apparatus (that is, the video game processing apparatus 100 or the other apparatus 101) contains data (character data) indicating one character has been described as an example. However, the configuration of the player character related information is not limited to this. Namely, the video game processing apparatus 100 may be configured so that the player character related information contains data (party data) indicating a plurality of characters each of which the player makes a companion thereof in the video game, for example. In this case, for example, the video game processing apparatus 100 may be configured so that the participating characters operated by the same player are assigned into a plurality of participation boxes at one fighting game.

In this regard, although it has not been mentioned particularly in the embodiment described above, the video game processing apparatus 100 may be configured so as to determine, with a specific probability, an already participating character that satisfies a specific condition (for example, the already participating character has a past record to be a champion in the fighting game by the predetermined number of times) as the participating character, for example. By configuring the video game processing apparatus 100 in such a manner, it is possible to increase variation in the participating characters. Therefore, it becomes possible to improve interest of the player in the video game (fighting game).

In this regard, in the embodiment described above, the video game processing apparatus 100 has been configured so as to carry out various kinds of processing such as the tournament match holding processing described above on the basis of the game program read out from the game cartridge 20. However, the video game processing apparatus 100 may acquire the game program via a communication network such as the Internet. Further, the video game processing apparatus 100 may serve as a game server to provide a game terminal with the game program via a communication network.

Further, in the embodiment described above, the video game processing apparatus 100 carries out various kinds of processing described above in accordance with a control program (for example, the video game processing program)

stored in a storage device (the storage section 12) equipped by the video game processing apparatus 100.

INDUSTRIAL APPLICABILITY

The present invention is useful to provide a video game processing apparatus in which it becomes possible to maintain interest of players in a fighting game even in a case where there are a few participants when to hold the fighting game in which a plurality of players can participate.

What is claimed is:

1. A video game processing apparatus for managing progress of a fighting game by receiving information necessary for the fighting game from other apparatuses, characters of a predetermined participation number participating in the fighting game, the video game processing apparatus comprising:
 a player character related information memory for storing player character related information, the player character related information containing identification data of the video game processing apparatus and player character data, the player character data indicating various kinds of data regarding a player character, the player character being a character that can be operated by a player who operates the video game processing apparatus;
 an already participating character related information memory for storing already participating character related information, the already participating character related information containing already participating character data and identification data of other already participating apparatuses, the already participating character data indicating various kinds of data regarding already participating characters of other apparatus characters, the other apparatus characters being characters that can be operated by other players, the other players being players who respectively operate the other apparatuses, the already participating characters being characters that have a past record to participate in a fighting game that has been played in the past by the video game processing apparatus, the other already participating apparatuses being respectively operated by the other players operating the already participating characters;
 a newly participating character related information memory for storing newly participating character related information, the newly participating character related information containing newly participating character data and identification data of other newly participating apparatuses, the newly participating character data indicating various kinds of data regarding newly participating characters, the newly participating characters being characters that can newly participate in the fighting game, players who operate the newly participating characters respectively operating the other newly participating apparatuses;
 a participating character determiner for determining participating characters by referring to the newly participating character related information, the participating characters participating in the fighting game along with the player character; and
 a fighting controller for controlling a fight between the participating characters determined by the participating character determiner,
 wherein, in a case where the number of characters obtained by combining the player character and the newly participating characters is less than the predetermined participation number, the participating character determiner refers to the already participating character related information; and selects participating characters of a deficient number among the already participating characters to obtain the participating characters of the predetermined participation number.

2. The video game processing apparatus according to claim 1, further comprising:
 a bonus related information creator for creating bonus related information, the bonus related information containing bonus information and the identification data corresponding to the respective participating characters, the bonus information indicating a bonus to be awarded to each of the participating characters that participate in the fighting game in a case where the fighting game is terminated;
 a connector for searching for an other apparatus from among the other apparatuses to which to automatically connect by wireless connections, the other apparatus becoming a correspondent of the video game processing apparatus; and
 a bonus information transmitter for transmitting the bonus information to the other apparatus connected by wireless connections by the connector.

3. The video game processing apparatus according to claim 1, further comprising:
 a participation request receiver for receiving a participation request into the fighting game from an other apparatus from among the other apparatuses, the participation request being carried out by presenting player character related information stored in the other apparatus as well as the video game processing apparatus;
 a newly participating character related information storer for storing the player character related information received by the participation request receiver in the newly participating character related information memory as the newly participating character related information; and
 an already participating character related information storer for storing the newly participating character related information in the already participating character related information memory as the already participating character related information in a case where the fighting game is terminated, the newly participating character related information indicating the participating character that participates in the fighting game.

4. The video game processing apparatus according to claim 1, wherein the fighting game is a video game in which opponents are determined by assigning the participating characters into participation boxes of the predetermined participation number of a tournament match or a league match, and
 wherein the video game processing apparatus further comprises:
 a participating character assignor for arbitrarily assigning the participating characters of the predetermined participation number determined by the participating character determiner into the participation boxes.

5. The video game processing apparatus according to claim 4, further comprising:
 a simplified fighting executor for carrying out a simplified fighting by the participating character on the basis of a predetermined simplified victory/defeat decision rule for deciding victory or defeat in the simplified fighting, the simplified fighting being a fighting in which the victory or defeat is decided by comparing the character data of the fighting characters,
 wherein the participating character assignor assigns the participating characters into the participation boxes in accordance with a result of the simplified fighting carried out by the simplified fighting executor.

6. A non-transitory computer-readable medium including a video game processing program product for causing a computer to receive information necessary for a fighting game from other apparatuses and to manage progress of the fighting game, characters of a predetermined participation number participating in the fighting game, wherein the computer comprises:

a player character related information memory for storing player character related information, the player character related information containing identification data of the video game processing apparatus and player character data, the player character data indicating various kinds of data regarding a player character, the player character being a character that can be operated by a player who operates the video game processing apparatus;

an already participating character related information memory for storing already participating character related information, the already participating character related information containing already participating character data and identification data of other already participating apparatuses, the already participating character data indicating various kinds of data regarding already participating characters of other apparatus characters, the other apparatus characters being characters that can be operated by other players, the other players being players who respectively operate the other apparatuses, the already participating characters being characters that have a past record to participate in a fighting game that has been played in the past by the video game processing apparatus, the other already participating apparatuses being respectively operated by the other players each operating the already participating character; and a newly participating character related information memory for storing newly participating character related information, the newly participating character related information containing newly participating character data and identification data of other newly participating apparatuses, the newly participating character data indicating various kinds of data regarding newly participating characters, the newly participating characters being characters that can newly participate in the fighting game, players who operate the newly participating characters respectively operating the other newly participating apparatuses, wherein the video game processing program product causes the computer to execute:

determining participating characters by referring to the newly participating character related information, the participating characters participating in the fighting game along with the player character; and controlling a fight between the participating characters determined in the determining participating characters, and wherein the determining participating characters includes:

in a case where the number of characters obtained by combining the player character and the newly participating characters is less than the predetermined participation number, referring to the already participating character related information; and selecting participating characters of a deficient number among the already participating characters to obtain the participating characters of the predetermined participation number.

* * * * *